United States Patent
Anderson et al.

(10) Patent No.: US 9,726,279 B2
(45) Date of Patent: Aug. 8, 2017

(54) SYSTEM AND METHOD TO CONTROL THE OPERATION OF A TRANSMISSION USING ENGINE PATTERNS

(71) Applicant: Allison Transmission, Inc., Indianapolis, IN (US)

(72) Inventors: Jessica Anderson, Indianapolis, IN (US); Stephen West, New Palestine, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 61 days.

(21) Appl. No.: 14/958,506

(22) Filed: Dec. 3, 2015

(65) Prior Publication Data

US 2017/0159803 A1 Jun. 8, 2017

(51) Int. Cl.
*G06F 17/00* (2006.01)
*F16H 61/02* (2006.01)
*G07C 5/08* (2006.01)

(52) U.S. Cl.
CPC ....... *F16H 61/0213* (2013.01); *G07C 5/0816* (2013.01); *F16H 2061/022* (2013.01); *F16H 2061/0216* (2013.01)

(58) Field of Classification Search
None
See application file for complete search history.

(56) References Cited

U.S. PATENT DOCUMENTS

| 4,364,265 A | 12/1982 | Dickson |
| 5,750,887 A | 5/1998 | Schricker |
| 5,771,861 A | 6/1998 | Musser et al. |
| 6,363,317 B1 | 3/2002 | Druzhinina et al. |
| 6,496,767 B1 * | 12/2002 | Lorentz ............... F16H 61/0213 123/443 |
| 6,694,806 B2 | 2/2004 | Kumagai et al. |
| 7,454,962 B2 | 11/2008 | Nishiyama et al. |

(Continued)

FOREIGN PATENT DOCUMENTS

CN 101706366 A 5/2010

OTHER PUBLICATIONS

Recep Kozan, Imdat Taymaz, Mersin Gokce, "An Experimental Approach for Engine Mapping", Modern Applied Science, CCSE Journal, vol. 3, No. 3, Mar. 2009; Adapazari-Turkey.

(Continued)

*Primary Examiner* — Dirk Wright
(74) *Attorney, Agent, or Firm* — Taft Stettinius & Hollister LLP; Stephen F. Rost

(57) ABSTRACT

A system and method of controlling the operation of a transmission using fuel consumption data. The system and method includes controlling the operation of a vehicle transmission which is operatively connected to an engine and to a transmission control module having access to a memory. Fuel consumption data for a plurality of engines is converted to engine efficiency loss data representative of the each of the engines' operation. The plurality of patterns, each representative of the operating characteristics of one of plurality of engines, is stored in the memory. Engine operating characteristics are recorded during operation of the vehicle. One of the pluralities of patterns is selected based on the recorded operating characteristics to operate the vehicle in a fuel efficient manner.

21 Claims, 5 Drawing Sheets

(56) References Cited

U.S. PATENT DOCUMENTS

| | | | |
|---|---|---|---|
| 7,487,030 | B2 | 2/2009 | Heap et al. |
| 7,512,477 | B2 | 3/2009 | Quigley et al. |
| 7,908,911 | B2 | 3/2011 | Renner et al. |
| 8,285,470 | B2 | 10/2012 | Wang et al. |
| 8,332,108 | B2 | 12/2012 | Kresse et al. |
| 8,340,925 | B2 | 12/2012 | Higgins et al. |
| 8,452,509 | B2 * | 5/2013 | Sujan ................. G01C 21/3469 180/165 |
| 8,639,431 | B2 | 1/2014 | Jentz et al. |
| 2005/0177293 | A1 * | 8/2005 | Ammann ............... B60K 31/04 701/54 |
| 2012/0296532 | A1 | 11/2012 | Murakami et al. |
| 2015/0073692 | A1 | 3/2015 | Malikopoulos |
| 2016/0144863 | A1 * | 5/2016 | Bevan ..................... F01N 3/208 701/54 |

OTHER PUBLICATIONS

L. Corredor, A. Escobar, I. Portnoy, E. Velez, Dept. of Mechanical Engineering "Prediction of Specific Fuel Consumption in Turbocharged Diesel Engines Under Load Performance", (EA4EPQ) European Association for the Development of Renewable Energies, Environment and Power Quality, Mar. 28-30, 2012; Santiago De Compostela (Spain).

Jacob Keith Keller, Thesis, "A Cost Effective Method to Create Accurate Engine Performance Maps & Updating the Nebraska Pumping Plant Performance Criteria"; University of Nebraska, Lincoln, Nebraska, Jan. 2014.

* cited by examiner

SYSTEM AND METHOD TO CONTROL THE OPERATION OF A TRANSMISSION USING ENGINE PATTERNS

CROSS-REFERENCE TO RELATED APPLICATION

U.S. Patent Application entitled "System and Method to Control the Operation of a Transmission Using Engine Fuel Consumption Data", filed on Dec. 3, 2015, is incorporated by reference herein in its entirety.

FIELD OF THE DISCLOSURE

The present disclosure relates to a multiple speed transmission, and more particularly to controlling the operation of a multiple speed transmission using engine patterns representative of engine fuel consumption data.

BACKGROUND

In a vehicle, a prime mover drives a set of wheels, or other ground engaging traction devices, which engages a support surface, such as a road or ground, to move the vehicle. Because the output of the prime mover, which includes engines and/or motors, must adapt to different speed requirements and road conditions, a transmission is located between the prime mover and a set of wheels to adjust the output of the prime mover in order to move the vehicle at different speeds. The transmission includes an input shaft, operatively connected to an output shaft of the prime mover, and an output shaft, operatively connected to a drivetrain connected to the wheels.

The transmission is configured to transmit power and torque from the engine to the drive train. In one type of conventional transmission, the transmission includes a variety of gears, shafts, and clutches configured to transmit torque through the transmission at finite, stepped gear ratios. Multiple speed transmissions use a number of friction clutches or brakes, planetary gearsets, shafts, and other elements to achieve a plurality of gear or speed ratio. In another type of transmission, a continuously variable transmission (CVT) is configured to continuously vary the ratio of an input rotational speed to an output rotational speed under control of a vehicle operator, typically by a speed controller input such as provided by a throttle.

Different engines are designed to have varying capabilities when operating in different operating ranges. The engines are, consequently, optimized for different conditions based on the engine manufacturer's designed operating characteristics. These different capabilities and characteristics are captured in fuel consumption values, which engine manufactures sometimes provide to a purchaser of the engine, such as a vehicle manufacturer or transmission manufacturer. In the case of a transmission manufacturer, the fuel consumption data is useful in determining when a transmission shift operation should be made to achieve fuel efficient operation of the engine. When available, fuel consumption data is not in a form that can be compared to other vehicle and powertrain losses. In addition, the format of the fuel consumption data is not consistent between one engine manufacturer and another engine manufacturer. Consequently, what is needed is a system and method for utilizing engine fuel consumption data to modify the operation of a transmission and to operate the engine efficiently.

SUMMARY

In one embodiment, there is provided a method of controlling the operation of a vehicle transmission operatively connected to an engine and operatively connected to a transmission control module having access to a memory. The method includes providing a plurality of engine patterns, wherein each of the plurality of engine patterns represents one of a plurality of different engines, and wherein each of the plurality of engine patterns is configured to model the operating characteristics of one of the plurality of different engines during operation thereof. The method further includes: recording a plurality of power operating points and associated fuel consumption values of the engine during operation. The method includes a selection from among the plurality of engine patterns which best agree with the measured fuel consumption points. One implementation of this process consisting of determining a weight factor for each of the recorded plurality of power operating points; determining a minimum brake specific fuel consumption (MnBSFC) value for each of the plurality of engine patterns using the recorded plurality of power operating points, the recorded fuel consumption values, and the determined weight factors; determining an error value for each of the plurality of engine patterns as a function of the determined MnBSFC values; selecting one of the plurality of engine patterns based on the determined error value; and operating the transmission using the selected one of the plurality of engine patterns.

In another embodiment, there is provided a method of controlling the operation of a vehicle transmission operatively connected to an engine and operatively connected to a transmission control module having access to a memory. The method includes receiving a plurality of engine patterns, wherein each one of the plurality of engine patterns represents a fuel consumption data record of a different one of a plurality of different engines and recording actual fuel consumption data of the engine during operation thereof. The method further includes determining an agreement between the recorded actual fuel consumption data and the plurality of engine patterns; selecting one of the pluralities of engine patterns as a function of the determined agreement; and using the transmission control module and the selected one of the plurality of engine patterns to operate the transmission.

In still another embodiment, there is provided a transmission system configured to drive a drive assembly of a vehicle in response to an engine output shaft of one of a plurality of different engine types, each responding to a throttle command. The transmission system includes a transmission having an input configured to be coupled to the engine output shaft and an output configured to drive the drive assembly. A memory is configured to store a plurality of engine patterns, wherein each one of the plurality of engine patterns represents a fuel consumption data record of a different one of the plurality of different engines. A transmission controller is operatively coupled to the transmission and to the memory. The transmission controller is configured to execute stored program instructions to: (i) record a plurality of engine operating points and associated fuel consumption values of the engine during operation thereof; (ii) determine an error value for each of the plurality of engine patterns using the recorded plurality of engine operating points and associated fuel consumption values; (iii) identify one of the plurality of engine patterns and the error value thereof; (iv) determine at least one of engine speed and engine torque from the throttle command; (v) determine a current operating condition of the transmission; (vi) access the memory to retrieve the identified one of the plurality of engine patterns; (vii) determine an updated operating condition of the transmission using the accessed identified one of the plurality of engine patterns and the at least one of engine speed and engine torque; and (viii) modify the current operating condition of the transmission to an updated operating condition of the transmission based on the determined updated operating condition of the transmission.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
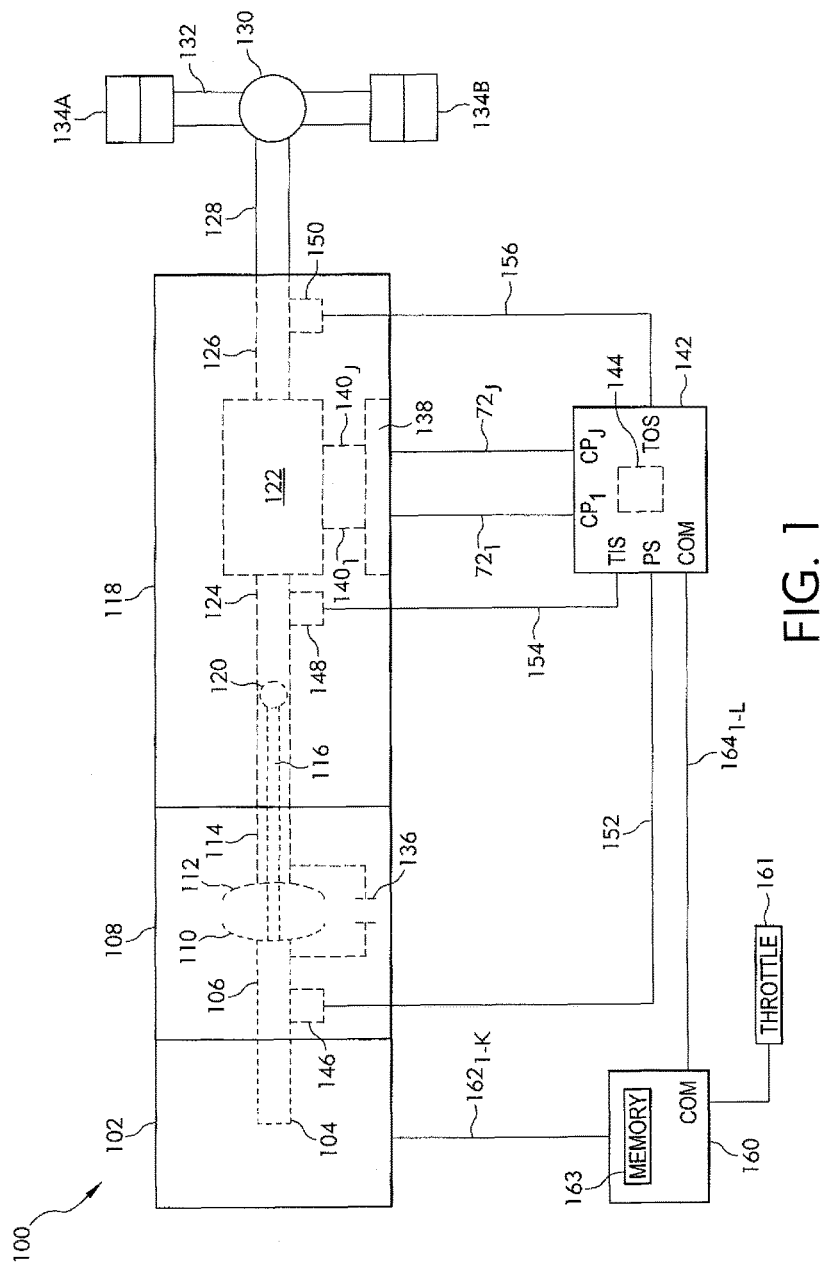
FIG. 1 is a block diagram of one embodiment of a powered vehicular system.

Referring now to FIG. 1, a block diagram and schematic view of one illustrative embodiment of a vehicular system 100 having an engine 102 and an automatic transmission 118 is shown. While FIG. 1 illustrates one type of transmission, the present disclosure is not limited to the vehicular system shown, and other types of transmissions are possible. For instance, any computer controlled device for changing speed ratios is included. Additionally, automated manual transmissions (AMT) and dual clutch transmissions (DCT), which do not include torque converters, are also possible.

In the illustrated embodiment, the engine 102 may include an internal combustion engine, diesel engine, or other fuel power-generating devices. The engine 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the engine 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the engine 102. In this arrangement, the engine 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the engine 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission controller 142, or transmission control module, that includes a memory unit 144 accessibly by the transmission controller in one embodiment. In other embodiments, the memory unit is separately located from the transmission controller. The transmission controller 142 is illustratively microprocessor-based, and the memory unit 144 generally includes instructions stored therein that are executable by a processor of the transmission controller 142 to control operation of the torque converter 108 and operation of the transmission 118, i.e., shifting between the various gears of the planetary gear system 122. It will be understood, however, that this disclosure contemplates other embodiments in which the transmission controller 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states or operating conditions of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the engine 102. The speed sensor 146 is electrically connected to a pump speed input, PS, of the transmission controller 142 via a signal path 152, and the transmission controller 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission controller 142 via a signal path 154, and the transmission controller 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission controller 142 via a signal path 156. The transmission controller 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission controller 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission controller 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the controller 142 in accordance with instructions stored in the memory unit 144.

In the illustrated embodiment, the system 100 further includes an engine controller 160 having an input/output port (I/O) that is electrically coupled to the engine 102 via a number, K, of signal paths 162, wherein K may be any positive integer. In one embodiment, the engine controller 160 includes a memory unit 163 or has access to a memory. The engine controller 160 is operable to control and manage the overall operation of the engine 102. A throttle 161 is operatively connected to the controller 160 and provides a desired engine speed input to the controller 161 to adjust the output speed of the drive unit. In other embodiments, the engine speed input is provided by the controller 160 as a cruise control generated drive unit speed. The engine controller 160 further includes a communication port, COM, which is electrically connected to a similar communication port, COM, of the transmission controller 142 via a number, L, of signal paths 164, wherein L may be any positive integer. The one or more signal paths 164 are typically referred to collectively as a data link. Generally, the engine controller 160 and the transmission controller 142 are operable to share information via the one or more signal paths 164 in a conventional manner. In one embodiment, for example, the engine controller 160 and transmission controller 142 are operable to share information via the one or more signal paths 164 in the form of one or more messages in accordance with a society of automotive engineers (SAE) J-1939 communications protocol, although this disclosure contemplates other embodiments in which the engine controller 160 and the transmission controller 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN). In addition, a Hardwire TPS (throttle position sensor) to transmission controller or Hardwire PWM (pulse width modulation) to transmission controller can be used.

Transmission shift schedules and other related instructions are included in software which is downloaded to the transmission controller 142. In other embodiments, the transmission controller 142 is preprogrammed. The transmission controller 142 controls the shifting of the transmission by electrically transferring instructions to the transmission such that certain actions are carried out by the synchronizers, brakes, clutches, dog clutches, pistons, etc. In one non-limiting embodiment, the transmission controller 142 is part of a transmission control circuit that can further include an electronic solenoid and valve assembly for controlling the engaging and disengaging of clutch assemblies, etc. Components within the transmission 118 are activated electrically, mechanically, hydraulically, pneumatically, automatically, semi-automatically, and/or manually. The transmission controller circuit is able to control the operation of the transmission to achieve desired performance.

Based on instructions in a transmission software program, the transmission control circuit (e.g., transmission controller 142) determines a shift schedule depending on a vehicle's driving condition and executes instructions contained in the software by sending signals through to control the transmission 118. The transmission controller 142, in different embodiments, also receives measurement data from the transmission 118 such as, for example, input speed from the input speed sensor 146 and output speed from the output speed sensor 130. In one embodiment in which the transmission does not include a torque converter, the transmission may only have an input speed sensor 146 and output speed sensor 150. The transmission controller 142, in different embodiments, also calculates various parameters including transmission gear ratios or ranges, which depend on the ratio of input speed to output speed.

The transmission controller 142, in different embodiments, receives accelerator pedal position (i.e., throttle percentage) from a throttle input source, for example throttle 161, which, in different embodiments is coupled to the engine controller 160 or vehicle control module (not shown) for transmitting throttle data over the data bus.

Information such as accelerator pedal position that is communicated over the data bus is not limited to a particular engine/transmission configuration. Instead, the data bus can be adapted to most vehicle setups.

The transmission controller 142 is operatively connected to the transmission 118 through the described sensors and data bus. The engine 102 is operatively connected to the engine controller 160, also known as an engine control module (ECM) to control the engine 102. The engine controller 160 may be further connected to various sensors of the vehicle that provide the engine controller 160 with various operating conditions associated with operation of the engine 102.

The transmission 118, in different embodiments, is configured to provide a torque-speed conversion from the generally higher speed engine 102 to a slower but more forceful output to the drive assembly including the propeller shaft 128. The drive assembly, in different embodiments, includes drive wheels, caterpillar tracks, ground engaging traction devices, etc. that moves the motor vehicle when driven by the engine 102 via the transmission 118.

The engine controller 160 and transmission controller 142, in different embodiments, are implemented using analog and/or digital circuit components. In one embodiment, the engine controller 160 and the transmission controller 142 each include a processor, such as a microcontroller or microprocessor. Furthermore, the engine controller 160 and transmission controller 142 each have one or more associated memory devices 144, 163 configured to store instructions to be respectively executed by the engine controller 160 and the transmission controller 142. The memory devices 144, 163 in different embodiments, include programmable read only memory devices, flash memory devices, random access memory devices, and/or other storage devices that store instructions to be executed and data to be processed by the engine controller 160 and the transmission controller 142.

Figure 2:
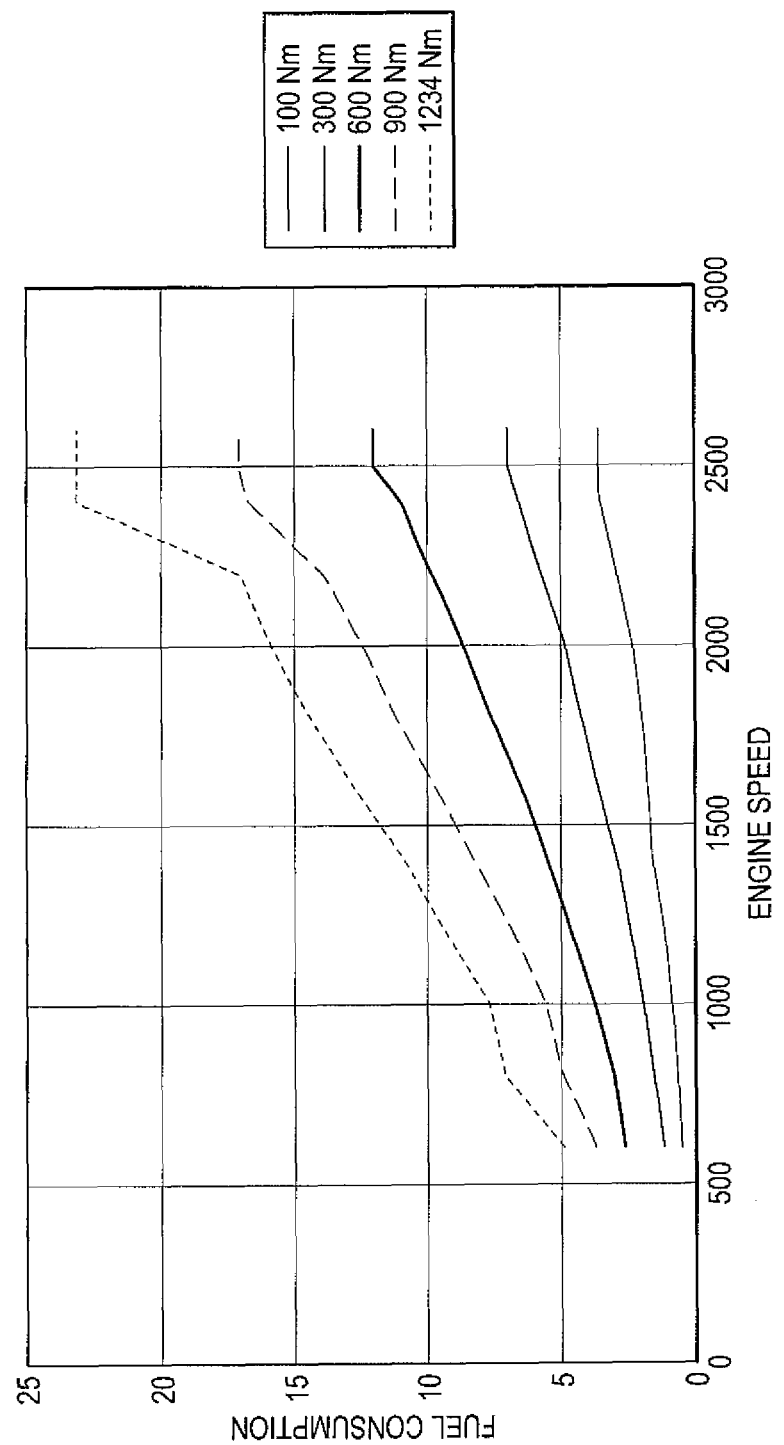
FIG. 2 is a graph representing fuel consumption data for an engine showing fuel consumption versus engine speed at a plurality of different engine torque outputs.

Fuel powered engines have varying capabilities at different operating ranges, and are optimized for different conditions based on the manufacturer's and the customer's intended applications. Each different type of engine is characterized by the manufacturer, and these characteristics are provided to the customer as engine fuel consumption data. In some cases, the engine fuel consumption data does not cover the entire range of engine operating characteristics. In other cases, the fuel consumption data is not provided, has not been updated, or is not available. The engine fuel consumption data is generally consistent for each engine of the same type, but different engines of different types have different fuel consumption data characteristics. In each instance of fuel consumption data, however, fuel consumption values increase with increasing torque and speed. In one example illustrated in FIG. 2, for instance, as the engine speed increases, the fuel consumed also increases. The graph of FIG. 2 also illustrates that the torque provided by the engine generally increases while engine speed and fuel consumption increase up to a certain value of fuel consumption and engine speed, at which point the torque levels off and no longer increases.

Figure 3:
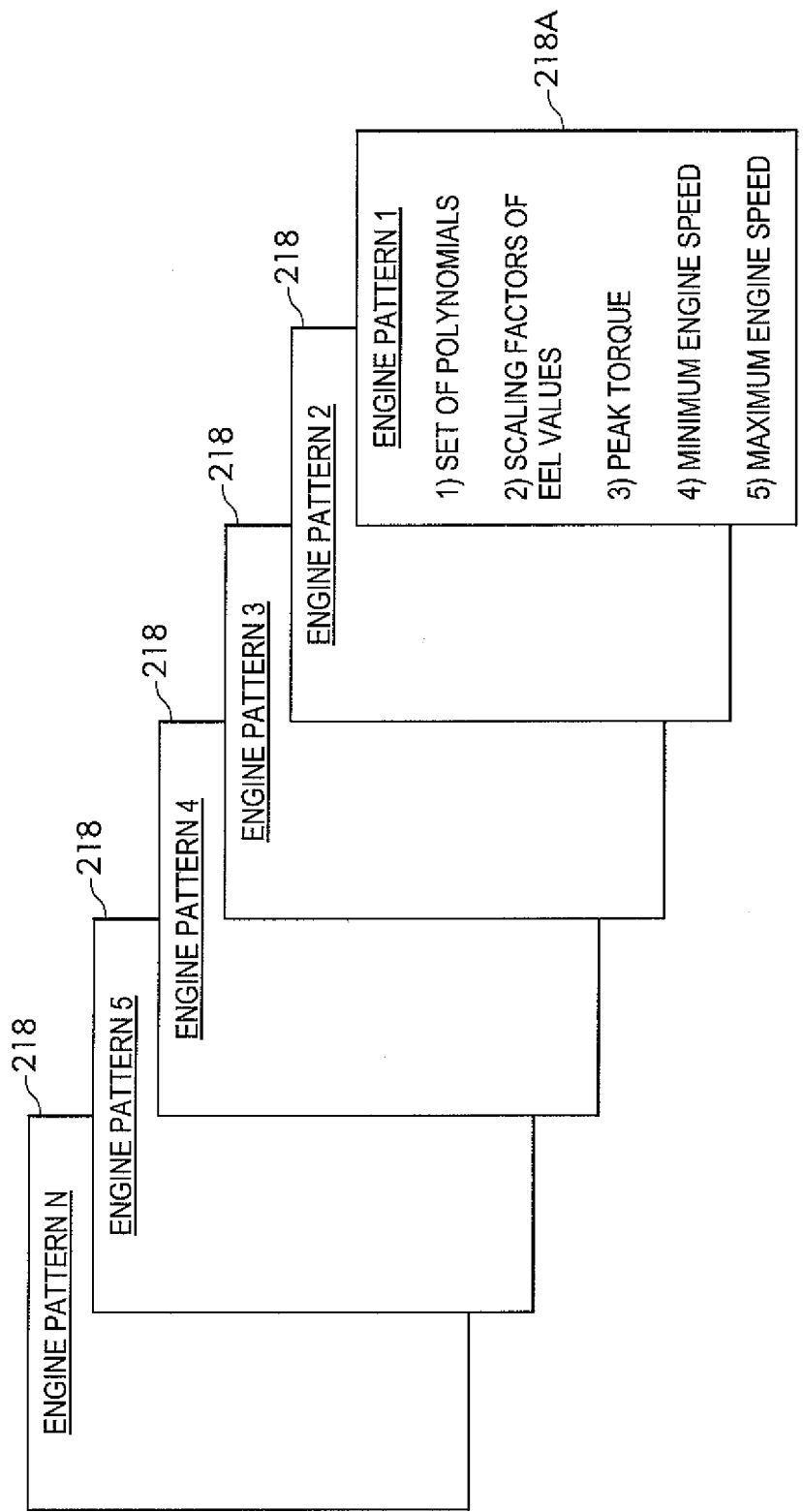
FIG. 3 is a schematic representation of a plurality of engine patterns each representative of the fuel consumption data of an engine.

The engine fuel consumption data, while helpful for determining the operating characteristics of an engine, does not always provide the necessary information to optimize the operation of a transmission responding to the rotational torque developed by an engine. In addition, the engine fuel consumption data generated by different engine manufacturers is not represented in a standardized format which can be consistently used by a transmission manufacturer which provides transmissions to a wide variety of vehicle manufacturers using different engines. For instance, some engine manufacturers provide the engine fuel consumption data as brake specific fuel consumption data in units of liters per kilowatt hour. Brake specific fuel consumption data is determined by the rate of fuel consumption divided by the power produced. As can be seen, therefore, a transmission manufacturer must be able to design a transmission which accommodates a large number of different types of engines. Unfortunately, however, the engine fuel consumption data provided by an engine manufacturer is not in a form which is readily used by a transmission manufacturer. The engine fuel consumption data is not only data intensive, but is also not configured to provide the information in a fashion which is efficiently used during transmission operation. For each of the engines having available engine fuel consumption data, an engine pattern 218, such as pattern 218A illustrated in FIG. 3 is generated. In one embodiment, the engine pattern is generated as described in co-pending U.S. Patent Application entitled "System and Method to Control the Operation of a Transmission Using Engine Fuel Consumption Data", filed on Date, Month, and Year, the entirety of which is incorporated by reference herein.

The patterns 218 are used to determine shift points of a transmission. For instance, the transmission controller 142 monitors one or more diagnostic responses and conditions to ensure that a shift occurs when the shift is considered by the transmission controller 142 to be one which does not reduce the operating efficiency of or damage the vehicle including, but which is preferred to place the engine and transmission in a more efficient operating condition.

Pattern 218A includes, in one embodiment five definitions: (1) a set of polynomials representative of the engine fuel consumption data, (2) a scaling factor of the engine efficiency loss (EEL) values, (3) a peak torque value of the engine, (4) a minimum engine speed value of the engine, and (5) a maximum engine speed value. While EEL values are described, the present disclosure is not limited to the use of the described EEL value determination. Other representations of engine efficiency are also included. Generally, any representation of engine efficiency which enables comparison to other vehicles and transmission losses is included.

The pattern 218 is identified as an engine efficiency loss pattern or EEL pattern. Each of the patterns is stored in the memory 144 of the transmission system of FIG. 1. In one embodiment, a vehicle manufacturer that uses a single type of transmission with different types of engines, stores a plurality of the patterns in the memory 144, one for each of the different types of engines. In another embodiment, some of engines do not have patterns, since engine fuel consumption data is not available. In this embodiment, one of the stored patterns is selected to best match the operating characteristics for the engine not having a pattern. Consequently, a pattern does not need to be specific to one engine. In other embodiments, a single pattern is used to represent multiple engines.

Once one or more of the engine patterns is stored in the memory 144, the type of engine to which the transmission 118 is connected is identified to the transmission controller 142. In one embodiment, the engine type is identified in the memory 163 of the engine controller 160. Communication between the engine controller 160 and the transmission controller 142 identifies the engine type to the transmission controller 142. In another embodiment, the engine type is identified to the transmission controller 142 as a stored value in the transmission accessible memory 144. With the identification of the engine type and the storing of the one or more patterns 218, the transmission controller 142 is configured to operate the transmission 118 in an efficient manner.

In other embodiments, one or more other memories accessible to the transmission controller 142 are used. The transmission controller 142 accesses the memory 144 during transmission operations to efficiently drive a vehicle drive train in response to engine speed, engine torque, vehicle speed, or other engine operating conditions which the transmission converts to a transmission output torque provided at transmission output shaft 126.

Each engine is therefore characterized as having an EEL pattern which provides engine operating characteristics of engine torque versus engine speed with EEL loss values.

An EEL value provides a measure of the variance of fuel consumption, with respect to the most efficient operating point of an engine. The loss values indicate a loss in engine power over the operating range of the engine and therefore indicate the engine operating conditions which are the most efficient operating conditions. The engine efficiency loss value is, therefore, determined as being a fuel consumption efficiency ratio, a, multiplied by fuel consumption minus the power provided for each of the provided engine fuel consumption data points.

$$\text{Engine Efficiency Loss} = \alpha * \text{Fuel consumption} - \text{Power}$$

In one embodiment, the EEL value is provided in kilowatts. By converting the engine fuel consumption data for each engine to corresponding engine efficiency loss values, a normalized set of operating characteristics for each engine is provided. By providing a normalized set of operating characteristics for each engine, the operation of one type of transmission is efficiently controlled when engines of different types are used with one type of transmission. In other embodiments, a number of different types of transmissions are coupled to a number of different types of engines. In this embodiment, each of the transmissions includes a pattern of one of the engines.

Each of the patterns 218 includes a set of polynomials which has been generated to characterize the relative engine efficiency values for an engine. In one embodiment, the number of speed polynomials is equal to seven, while still representing the full speed range of the engine. Establishing the number of representative polynomials at seven has been shown to maintain the integrity of engine efficiency loss values calculated, while condensing the amount of data to be stored in memory. In one embodiment, the first polynomial represents the lowest engine speed. The last polynomial, or seventh polynomial in this embodiment, represents the highest engine speed, with the other five polynomials spaced evenly throughout an engine's operating range. In other embodiments, the number of polynomials selected is more, or less, than seven. The number of polynomials is selected based on the desired accuracy of reconstructed engine data using the polynomials, the amount of memory available for storing the polynomials, and the speed of polynomial calculations provided by the transmission controller. The present disclosure, however, is not limited to patterns having a specific number of polynomials. In other embodiments, the patterns include other data abstraction representations of an engine's fuel consumption data are included. Other methods and mechanisms of compression data are included. For instance, a series of values could be stored with intermediate results determined by interpolation. In other embodiments if sufficient memory and computing power are provided, calculated values of operating points are stored and processed.

In one embodiment, a determination of engine efficiency loss is used as a measure of fuel consumption with respect to the most efficient operating point and engine power across an engine's operating range. In other embodiments, other methods and mechanisms are used to determine the consistency between the observed fuel consumption data and the plurality of engine patterns. The minimum brake specific fuel consumption (MnBSFC), the most efficient operating point of an engine, is an integral part of the calculation for engine efficiency loss values. For multiple torque and speed points, one relationship between minimum brake specific fuel consumption, engine efficiency losses, and fuel consumption is:

$$\begin{bmatrix} EEL(1) + P_{eng}(1) \\ \vdots \\ EEL(n) + P_{eng}(n) \end{bmatrix} MnBSFC = \begin{bmatrix} FC(1) \\ \vdots \\ FC(n) \end{bmatrix}$$

Where: EEL: Engine Efficiency Loss (units of kilowatts); $P_{eng}$: Engine power (units of kilowatts); MnBSFC: minimum brake specific fuel consumption (units of liters per kilowatt hour); FC: Fuel consumption (units of liters per hour). Other methods of determining MnBSFC are possible.

In order to provide a weighted MnBSFC, the weight of each power point would be incorporated into the above equation as:

$$\begin{bmatrix} (EEL(1) + P_{eng}(1)) * \text{weight}(1) \\ \vdots \\ (EEL(n) + P_{eng}(n)) * \text{weight}(n) \end{bmatrix} MnBSFC = \begin{bmatrix} FC(1) * \text{weight}(1) \\ \vdots \\ FC(n) * \text{weight}(n) \end{bmatrix}$$

A least squares estimate method is used to calculate the most efficient engine point when provided with fuel consumption, power, and engine efficiency losses. The least squares estimate of the minimum brake specific fuel consumption is the value which minimizes the function:

$$\Sigma(FC_i - (MnBSFC*(EEL+P_{eng})_i))^2$$

The minimum is found by taking the derivative with respect to MnBSFC, and solving for zero. In doing so, minimum brake specific fuel consumption is:

$$MnBSFC = \sum \frac{(EEL + P_{eng})_i * FC_i}{(EEL + P_{eng})_i^2}$$

In one embodiment, a count of each power instance, a weight factor, is incorporated to better represent the specific operating conditions of the engine. The function to be minimized, is consequently, revised to incorporate weighting as follows.

$$\Sigma(\text{weight}_i*FC_i - \text{weight}_i*(MnBSFC*(EEL+P_{eng})_i))^2$$

Therefore, solving for minimum brake specific fuel consumption, the formula becomes, when including the weight factors, the following formula.

$$MnBSFC = \sum \frac{\text{weight}_i^2 * ((EEL + P_{eng})_i * FC_i)}{\text{weight}_i^2 * (EEL + P_{eng})_i^2}$$

In another embodiment, the weight factors are not included to calculate MnBSFC.

The previous formula, including the weight factors (which can be of any value including 1, where weights are not determined), is used to determine the closest agreement or match between the pattern and the measured fuel consumption data or fuel operating points. The specific minimum brake specific fuel consumption is then used to calculate an error value for each pattern as follows.

$$\text{Error} = \Sigma((MnBSFC*(EEL+P_{eng})_i) - FC_i)^2$$

This error value (in units of (liters per hour)$^2$) which is determined for each of the patterns, is used to compare the how effectively each of the different stored EEL patterns represents the operating characteristics of the engine. The error value, therefore, is used to determine which of the stored EEL patterns best matches the recorded fuel rates. The EEL pattern that produces the smallest error amount is then utilized as a representation for the engine's fuel consumption data table.

A predefined pattern is better to use than actual recorded fuel consumption data, because the pattern includes information for all torque and speed combinations, not just the torques and speeds the engine has experienced or for which the engine has data. The predefined pattern also prevents bad fuel rate readings from causing undesirable shifting characteristics. Weighting allows certain operating points to become more of a factor, or have greater importance, when calculating an error value. Weighting emphasizes the operating points that are most important to the engine, i.e. the conditions under which the engine experiences most often, so that the magnitude of the error at those points is highlighted. Conversely, it allows for points that may not have very many fuel readings to be less of a factor in the overall error calculation. When accounting for weighting the error formula becomes:

$$\text{Error} = \frac{\sum \text{weight}_i^2 * ((MnBSFC*(EEL + P_{eng})_i) - FC_i)^2}{\sum \text{weight}_i^2}$$

The resulting calculated error value represents the deviation between the recorded fuel consumption values and the fuel consumption projected by stored EEL patterns over the operating range of the engine. The error value can be lessened by accurate and specific EEL patterns and accurate fuel rate readings from the engine. In one embodiment, an error value calculated between one engine and a selected pattern based on that same type of engine is less than 1.0 liter per hour.

Figure 4:
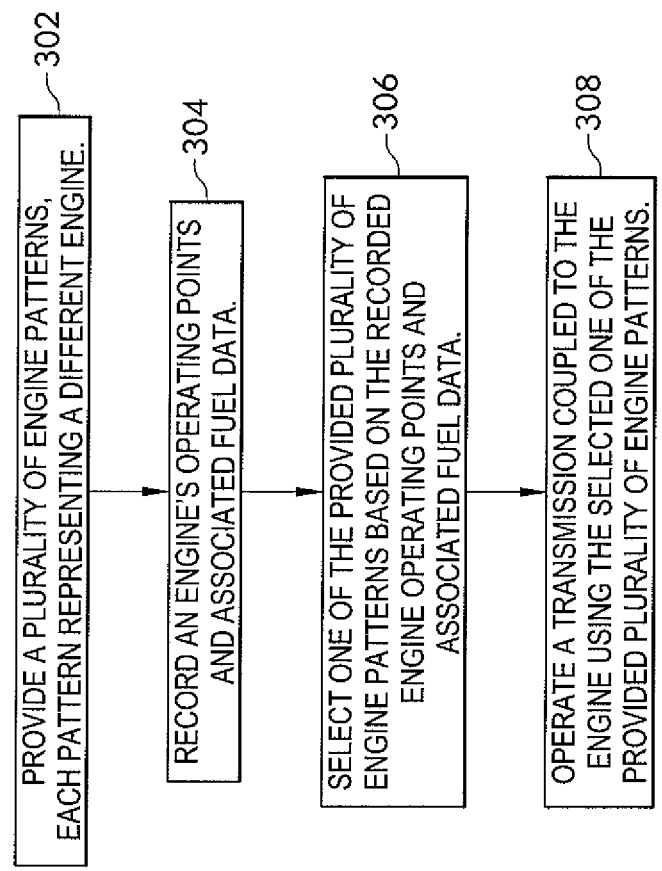
FIG. 4 is a block diagram of a process to control the operation of a transmission using one of a plurality of engine patterns.

FIG. 4 is a block diagram of a process to control the operation of a transmission using one of a plurality of the stored engine patterns, wherein the engine patterns includes engine efficiently loss patterns which include a plurality of polynomials or other data representations of an engine's fuel consumption data.

A plurality of engine patterns are provided and stored in memory 144 of the transmission system. In still other embodiments, the engine patterns are accessible wirelessly by wireless communication links with patterns being stored external to the vehicle. The plurality of engine patterns is provided by an engine manufacturer, a transmission manufacturer, or a vehicle manufacturer at block 302. In other embodiments, the engine patterns are provided by a test lab organization or other facilities having the capability to generate engine patterns based on engine fuel data. In still other embodiments, a transmission manufacture receives engine operating points from a variety of sources and generates a set of patterns for all of the data where each of the patterns has been reduced to a common organizational structure which enables the comparison of operating data from different engines.

Once a vehicle is placed into operation by an owner, lessee, or renter, the vehicle records the engine's operating points and associated fuel data over a period of time, as shown at block 304. The recorded data is stored and then used to select one of the provided plurality of engine patterns based on the recorded engine operating points and associated fuel data at block 306. Once the pattern has been selected, the transmission is operated based on the selected one of the plurality of engine patterns at block 308.

Figure 5:
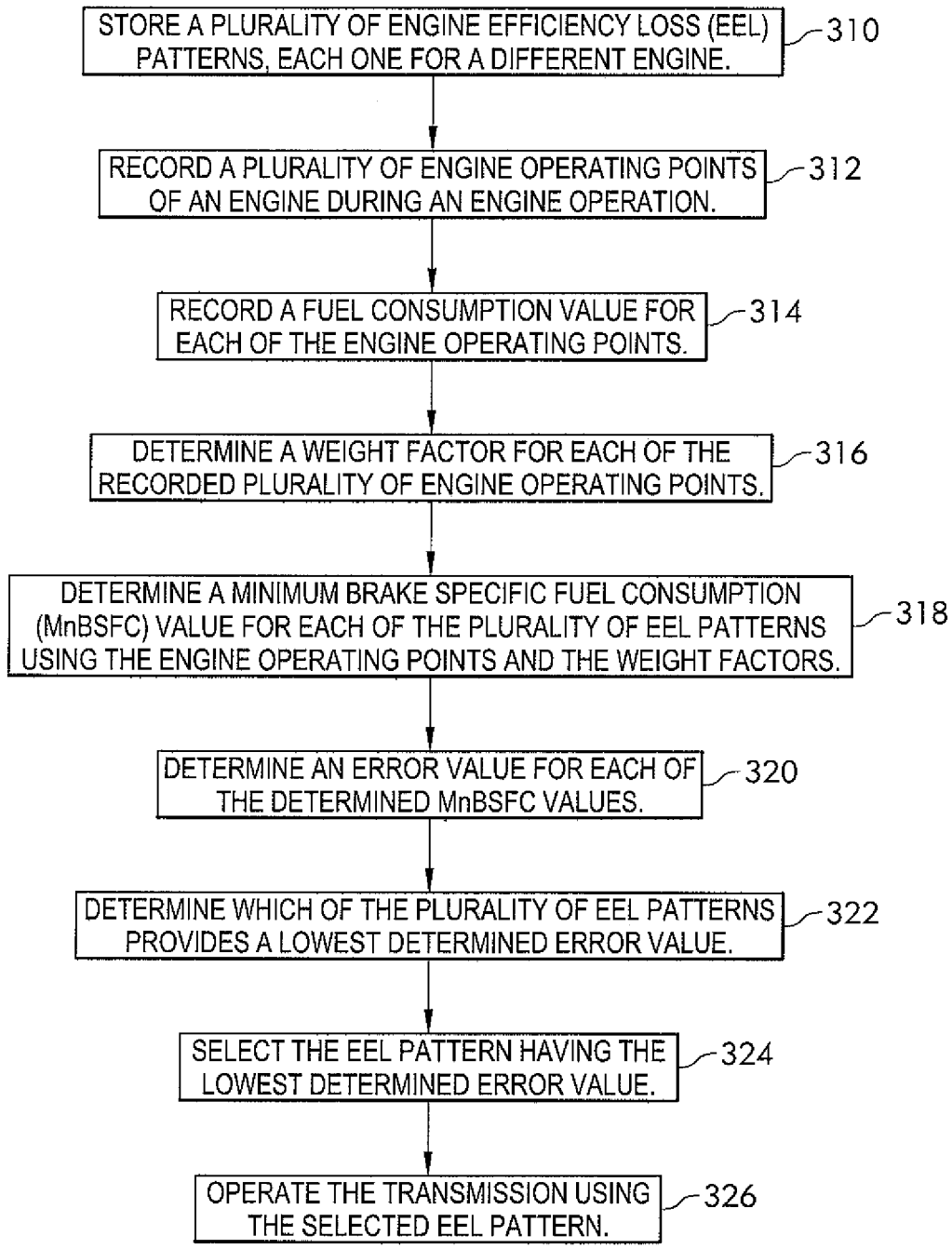
FIG. 5 is a block diagram of another process to control the operation of a transmission using one of a plurality of engine patterns.

In another embodiment using engine efficiency loss patterns as further illustrated in FIG. 5, a plurality of EEL patterns are stored in memory 144, wherein each of the patterns represents the fuel consumption data for a single engine at block 310. While there are many different kinds or types of engines, each having its own fuel consumption data, the number of stored patterns is less than the total number of engines which are configured to be coupled to a transmission. In some instances, one or more of the engines does not include fuel consumption data, and therefore a pattern for such an engine is selected from one of the stored patterns to operate the transmission. In other embodiments, one of the stored patterns is sufficiently accurate to operate the transmission, even though fuel consumption data is available for the particular engine being coupled to the transmission. Because the patterns are compressed versions of a complete data set for an engine, the pattern, in some cases, is not exact for all fuel data points. If the engine, for instance, is running in a small region of the engine's operating envelope, it is possible that the compressed map of a different engine could be a better match within that particular small region. Consequently, the amount of memory required to operate a transmission and the amount of data manipulation required to select of an appropriate pattern are reduced.

Once the vehicle begins operation, the engine power operating points (speed and torque values) are recorded over a predetermined period of time at block 312. In addition to recording the speed and torque values, a fuel consumption value is also recorded for each operating point at block 314. The predetermined period of time, in different embodiments, ranges from an hour, a few hours, and a few days or more. In one embodiment, the predetermined period of time is selected upon engine startup to record the operation of the engine over predetermined period of time, which is considered to be sufficient to record an engine's operation characteristics throughout an entire range of operating conditions experienced by the engine. In another embodiment, the period of time over which the operating characteristics is determined by the amount of data recorded. In this embodiment, the pattern is only selected after a predetermined amount of data is recorded.

Once the operating points and fuel consumption values are recorded over the period of time, a weight factor for each of the recorded plurality of operating points is determined at block 316. In one embodiment, the weight factor is the number of occurrences of each of the recorded operating points and corresponding fuel consumption values. In another embodiment, the weight factors are the determined number of occurrences multiplied by a predetermined scaling factor selected to accommodate the transmission system coupled to the engine.

After the operating points, fuel consumption values, and number of occurrences have been recorded and stored in the memory 144, a minimum brake specific fuel consumption value is determined for each of the stored plurality of EEL patterns. As described herein, a value of MnBSFC is determined at block 318 and as described herein.

The determined values of MnBSFC are then used to determine an error value at block 320 for each of the EEL patterns. The error value, in different embodiments, either uses a weight factor or does not use a weight factor, as described herein. Each of the error values is then compared to the other determined error values to determine the lowest determined error value amongst all of the patterns at block 322. The EEL pattern having the lowest determined error value is selected at block 324 from among the stored EEL patterns having higher error values. In another embodiment, the selected EEL pattern is selected as function of the value of the determined error values, such as comparing the determined error values to a predetermined acceptable value.

Once selected, the transmission system operates according to the selected EEL pattern at block 326.

In one embodiment, the selected pattern is used throughout the life of the engine. In another embodiment, a first selected pattern is replaced by another selected pattern (a different pattern) if it is determined that the first selected pattern no longer provides the desired results when operating the transmission. In this embodiment, the vehicle operating characteristics are recorded a second time to determine if the first selected pattern still provides the best representation of the engine's operating characteristics. If not, a second pattern is selected that better fits the engine's operating characteristics. Using a second pattern can be preferred if the engine's operating characteristics change over time due to aging of the engine through use. A second pattern can also be preferred if the vehicle and the engine experience a change in operating conditions. For instance, a delivery vehicle operating in a mountainous region uses a first pattern, while the same vehicle later operating at a different location or region, such as at sea level, uses a second pattern.

In another embodiment, if a truck, which was once a local delivery truck with a large amount of stop and go driving, changes purposes to become a long distance delivery truck, different portions of the engine operating range are utilized, which potentially requires the selection of a different pattern. In this embodiment, if the original use of the truck is only in a narrow band of its operating range, the selected pattern could be different than the one which actually corresponds to the truck's engine, since the smaller operating range can correspond to more than one pattern. If, however, the same truck later operates over a larger portion of its overall operating range, the system selects the correct pattern, i.e. the one matching the engine, once the operating points and associated weights are more evenly distributed. The algorithm automatically starts to learn any new or different operating conditions, if pattern learning is enabled in the software. In one embodiment, changes to the software are required to turn on and off continuous pattern learning. In another embodiment, continuous pattern learning is turned on or off with a user accessible switch.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of controlling the operation of a vehicle transmission operatively connected to an engine and operatively connected to a transmission control module having access to a memory, the method comprising:
 providing a plurality engine patterns, wherein each of the plurality of engine patterns represents one of a plurality of different engines, and wherein each of the plurality of engine patterns is configured to model the operating characteristics of one of the plurality of different engines during operation thereof;
 recording a plurality of power operating points and associated fuel consumption values of the engine during operation thereof;
 determining a weight factor for each of the recorded plurality of power operating points;
 determining a minimum brake specific fuel consumption (MnBSFC) value for each of the plurality of engine patterns using the recorded plurality of power operating points, the recorded fuel consumption values, and the determined weight factors;

determining an error value for each of the plurality of engine patterns as a function of the determined MnB-SFC values;

selecting one of the plurality of engine patterns based on the determined error value; and operating the transmission using the selected one of the plurality of engine patterns.

2. The method of claim 1 further comprising continuously updating the determined error value as a function of the recorded plurality of operating points and associated fuel consumption values.

3. The method of claim 2 further comprising selecting a different one of the plurality of engine patterns when the updated error value reaches a preferred value.

4. The method of claim 3 further comprising operating the transmission using the different one of the plurality of engine patterns.

5. The method of claim 4 wherein the selecting a different one of the plurality of engine patterns when the updated error value reaches a preferred value of better than a predetermined margin of a previously determined error value.

6. A method of controlling the operation of a vehicle transmission operatively connected to an engine and operatively connected to a transmission control module having access to a memory, the method comprising:

receiving a plurality of engine patterns, wherein each one of the plurality of engine patterns represents a fuel consumption data record of a different one of a plurality of different engines;

recording actual fuel consumption data of the engine during operation thereof;

determining an agreement between the recorded actual fuel consumption data and the plurality of engine patterns;

selecting one of the plurality of engine patterns as a function of the determined agreement;

using the transmission control module and the selected one of the plurality of engine patterns to operate the transmission.

7. The method of claim 6 wherein the determining the agreement includes determining the agreement using data compression to determine an error value for each of the plurality of engine patterns.

8. The method of claim 7 wherein the determining the agreement includes determining the error value using a predetermined set of polynomials.

9. The method of claim 8 wherein the determining the error value using the predetermined set of polynomials includes using a first polynomial representing a lowest engine speed, a last polynomial representing a highest engine speed, and using one or more intermediate polynomials representing one or more intermediate engine speeds between the lowest engine speed and the highest engine speed.

10. The method of claim 9 wherein the using the predetermined set of polynomials to determine the error value includes using a reduced set of the set of polynomials having at least seven polynomials.

11. The method of claim 7 further comprising storing the recorded actual fuel consumption data of the engine over a predetermined first period of time to determine weight values for each of the recorded actual fuel consumption data, wherein the weight values are based on a frequency of occurrence of each of the recorded actual fuel consumption data over the first period of time.

12. The method of claim 11 further comprising determining a first error value for each of the plurality of engine patterns using the recorded actual fuel consumption data over the first period of time and the weight values and identifying a first period of time engine pattern having the lowest error value over the first period of time.

13. The method of claim 12 further comprising storing the recorded actual fuel consumption data of the engine over a predetermined second period of time to determine weight values based on a frequency of occurrence of each of the recorded actual fuel consumption data over the second period of time.

14. The method of claim 11 further comprising determining a second error value for each of the plurality of engine patterns using the recorded actual fuel consumption data over the second period of time and the weight values and identifying a second period of time engine pattern having the lowest error value over the second period of time.

15. The method of claim 14 further comprising using the transmission control module and the identified one of the first period of time engine pattern and the second period of time engine pattern to operate the transmission.

16. A transmission system configured to drive a drive assembly of a vehicle in response to an engine output shaft of one of a plurality of different engine types, each responding to a throttle command, the transmission assembly comprising:

a transmission including an input configured to be coupled to the engine output shaft and an output configured to drive the drive assembly;

a memory configured to store a plurality of engine patterns, wherein each one of the plurality of engine patterns represents a fuel consumption data record of a different one of the plurality of different engines; and a transmission controller operatively coupled to the transmission and to the memory, the transmission controller configured to execute stored program instructions to:

record a plurality of engine operating points and associated fuel consumption values of the engine during operation thereof;

determine an error value for each of the plurality of engine patterns using the recorded plurality of engine operating points and associated fuel consumption values;

identify one of the plurality of engine patterns and the error value thereof;

determine at least one of engine speed and engine torque from the throttle command;

determine a current operating condition of the transmission;

access the memory to retrieve the identified one of the plurality of engine patterns;

determine an updated operating condition of the transmission using the accessed identified one of the plurality of engine patterns and the at least one of engine speed and engine torque; and modify the current operating condition of the transmission to an updated operating condition of the transmission based on the determined updated operating condition of the transmission.

17. The transmission system of claim 16 wherein the transmission controller is further configured to execute stored program instructions to:

determine whether the updated operating condition of the transmission is an acceptable operating condition.

18. The transmission system of claim 17 wherein the memory is configured to store one or more unacceptable transmission operating conditions.

19. The transmission system of claim 18 wherein the transmission controller is further configured to execute stored program instructions to:
   compare the updated operating condition to the stored one or more unacceptable transmission operating conditions to determine whether the updated operating condition is an acceptable transmission operating condition.

20. The transmission system of claim 19 wherein the transmission controller is further configured to execute stored program instructions to:
   not modify the current operating condition of the transmission to the updated operating condition if the updated operating condition is not an acceptable operating condition; and
   provide an alert indicating that the updated operating condition is an unacceptable operating condition.

21. The transmission system of claim 20 wherein the transmission controller is further configured to execute stored program instructions to:
   modify the current operating condition of the transmission to the updated operating condition if the updated operating condition is an acceptable operating condition.

* * * * *